United States Patent [19]
Daido

[11] Patent Number: 4,720,791
[45] Date of Patent: Jan. 19, 1988

[54] METHOD OF PROCESSING SIGNAL OF A STEERING ANGLE SENSOR

[75] Inventor: Toshihiko Daido, Osaka, Japan

[73] Assignee: Koyo Seiko Co., Ltd., Osaka, Japan

[21] Appl. No.: 878,820

[22] Filed: Jun. 26, 1986

[30] Foreign Application Priority Data

May 9, 1984 [JP] Japan .................................. 59-93535

[51] Int. Cl.⁴ .............................................. G06F 15/20
[52] U.S. Cl. .................................... 364/424; 364/571; 180/142
[58] Field of Search .............. 364/424, 426, 571, 550, 364/551; 180/79.1, 140–143; 280/91; 74/388 PS

[56] References Cited

U.S. PATENT DOCUMENTS 4,497,026 1/1985 Braschel et al. .................... 364/426
4,615,321 10/1986 Haefner et al. ..................... 364/571
4,645,025 2/1987 Ohe et al. ............................ 180/140
4,660,671 4/1987 Behr et al. ........................... 180/142
4,670,852 6/1987 Masaki et al. ....................... 364/426

Primary Examiner—Gary Chin
Attorney, Agent, or Firm—Finnegan, Henderson, Farabow, Garrett and Dunner

[57] ABSTRACT

A method is disclosed for generating a steering angle signal for a motor vehicle by processing a signal produced by a steering angle sensor to eliminate erroneous steering angle signal values caused by a floating state of a potentiometer included in the sensor to output the steering angle signal value corresponding to the rotational angle of a rotatable steering handle shaft where the erroneous signal values occur at specific angular positions of the handle shaft where the potentiometer is in the floating state.

5 Claims, 12 Drawing Figures

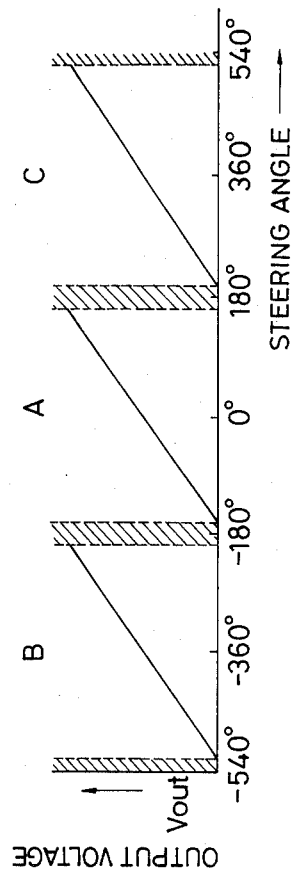
FIG. 1B
FIG. 1A
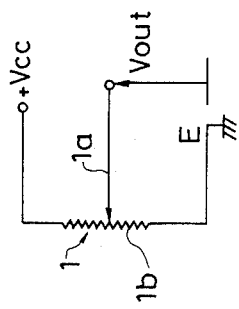
FIG. 2
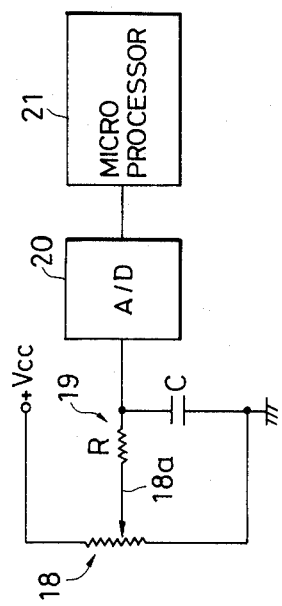
FIG. 5

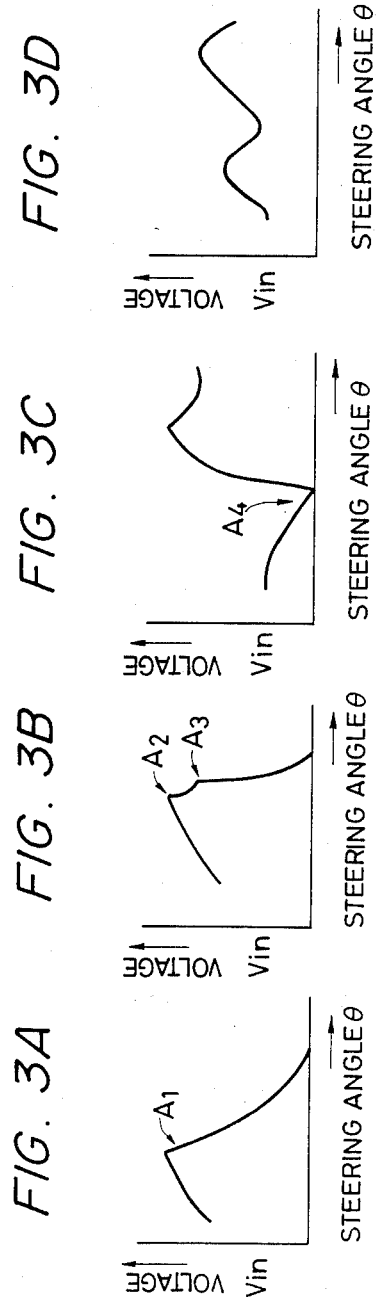

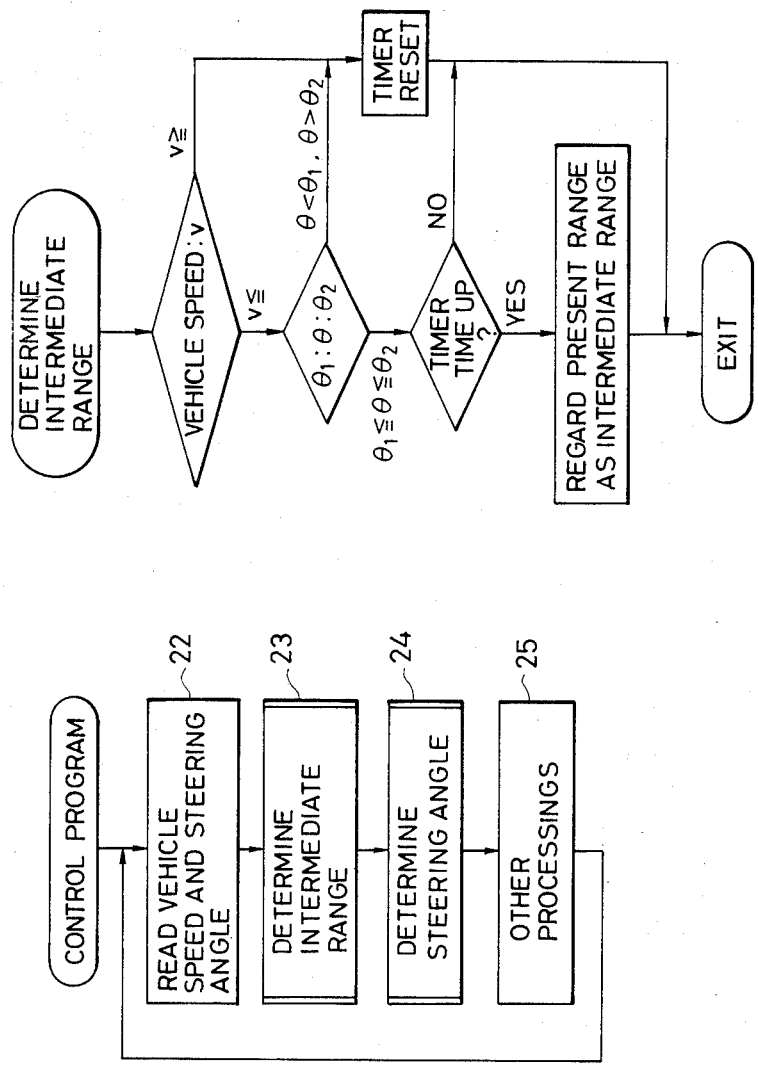

METHOD OF PROCESSING SIGNAL OF A STEERING ANGLE SENSOR

FIELD OF THE INVENTION

The present invention relates to a method of processing a signal of a steering angle sensor in which an output voltage of a potentiometer is detected as a signal representing a steering angle.

BACKGROUND OF THE INVENTION

A control apparatus for varying steering power in a power steering unit in accordance with the running conditions of a vehicle, i.e., the steering conditions, etc., is arranged such that the steering angle is generally used as one of the steering conditions. A quantity of rotation of a handle shaft is detected by a steering angle sensor so as to rotate a steering shaft by a quantity corresponding to a detection signal of the sensor. This is disclosed, for example, in Japanese Patent Application (OPI) No. 60967/82 (the term "OPI" as used herein means an unexamined published application).

Conventionally, a potentiometer is used as the sensor for detecting a steering angle of a vehicle. Since the range of the steering angle corresponds to several revolutions of a handle shaft, there is a relationship as shown in FIG. 1B between the output voltage $V_{out}$ of a potentiometer 1 shown in FIG. 1A and a steering angle $\theta$. In FIG. 1B, the shaded portions show the ranges of steering angle $\theta$ corresponding to the state where a slider member 1a of the potentiometer 1 is positioned off of a resistor 1b. In these ranges, the output terminal of the potentiometer 1 is in a floating state because it is separated from both a source terminal $+Vcc$ and an earth terminal E.

In a steering angle sensor of this kind, on the other hand, a low-pass filter 2 comprising a resistor R and a capacitor C as shown in FIG. 2, is provided in a circuit that is supplied with the output of the potentiometer 1. Accordingly, if the slider member 1a is in a floating state, the capacitor C is discharged through an input impedance $Z_i$ of a circuit portion 3 in the next stage of the low-pass filter 2. Consequently, a voltage $V_{in}$ supplied from the filter 2 to the succeeding stage circuit portion 3 varies as shown in FIG. 3A.

When the slider member 1a of the potentiometer 1 reaches the earth terminal E, the capacitor C is rapidly discharged through the resistor R of the low-pass filter 2 so that the voltage $V_{in}$ is lowered steeply as shown in FIG. 3B. If the slider member 1a is moved beyond the source terminal $+Vcc$ from the earth terminal, the capacitor C is suddenly charged so that the voltage $V_{in}$ rises steeply as shown in FIG. 3C. The variations in the voltage $V_{in}$ due to the charging and discharging of the capacitor C in the low-pass filter 2 cause the voltage $V_{in}$ not to correspond to an actual steering angle. Accordingly, the use of such an output signal of the filter as a signal representing the steering angle causes errors in the foregoing control of steering power. That is, it becomes impossible to judge whether the variation in the output voltage of the steering angle sensor is caused by the steering operation or by the charging and discharging of the capacitor.

To solve this problem, it has been proposed to provide a gearing mechanism between the potentiometer and the handle shaft to limit the maximum revolutional angle of the potentiometer to within 360 degrees. The handle shaft is rotated by several turns within this 360 degree range of revolutional angle. In this case, however, problems occur in the resolution of the steering angle and accuracy is reduced due to backlash of the gearing mechanism.

It is therefore an object of the present invention to solve the foregoing problems in the prior art.

Another object of the present invention is to provide a method of processing a signal of a steering angle sensor in which when an output voltage of a potentiometer is detected as a signal representing a steering angle, it is possible to improve the resolution of steering angle.

A further object of the present invention is to prevent a signal that does not correspond to an actual steering angle due to a noise filter from being erroneously detected in a range of steering angle where a slider member of the potentiometer is in a floating state.

These and other objects are attained by a method for generating a steering angle signal for a motor vehicle by processing a signal produced by a steering angle sensor to eliminate erroneous steering angle signal values caused by a floating state of a potentiometer included in the sensor to output the steering angle signal value corresponding to the rotational angle of a rotatable steering handle shaft when the erroneous signal value occurs at specific angular positions of the handle shaft when the potentiometer is in the floating state, the method comprising the steps of determining the current steering angle signal value outputted by the potentiometer, determining if the rotational angle of the handle shaft is within a selected range of rotational angles, calculating an estimated steering angle signal value if the rotational angle of the handle shaft is determined to be within the selected range of rotational angles, calculating a first difference value corresponding to the difference between the current steering angle signal value and the estimated steering angle signal value, setting the steering angle signal to the current steering angle signal value if the first difference value is less than a predetermined difference value, and setting the steering angle signal to a predetermined angle signal value if the first difference value is greater than an equal to the predetermined difference value whereby the steering angle signal is set to the current steering angle signal value if the potentiometer is not in the floating state and is set to the predetermined angle signal value if the potentiometer is in the floating state.

BRIEF DESCRIPTION OF THE DRAWINGS

The manner by which the above object and other objects, advantages, and features of the present invention are achieved will become fully apparent from the following detailed description when it is considered in view of the accompanying drawings, wherein:

FIG. 1A is an electrical equivalent circuit diagram of a steering angle sensor;

FIG. 1B is a diagram showing the relationship between the steering angle and the output voltage of the steering angle sensor;

FIG. 2 is a diagram showing a steering angle signal input circuit;

FIGS. 3A through 3C are graphs showing the relationship between the steering angle and the charge/discharge of a capacitor of the circuit of FIG. 2;

FIG. 3D is a diagram showing the steering angle signal in the normal steering operation;

FIG. 5 is a circuit diagram of an embodiment of the sensor of the present invention; and FIGS. 6A through 6C are flow charts for signal processing in a system using the sensor of the present invention.

DETAILED DESCRIPTION OF THE PREFERRED EMBODIMENTS

Figure 4:
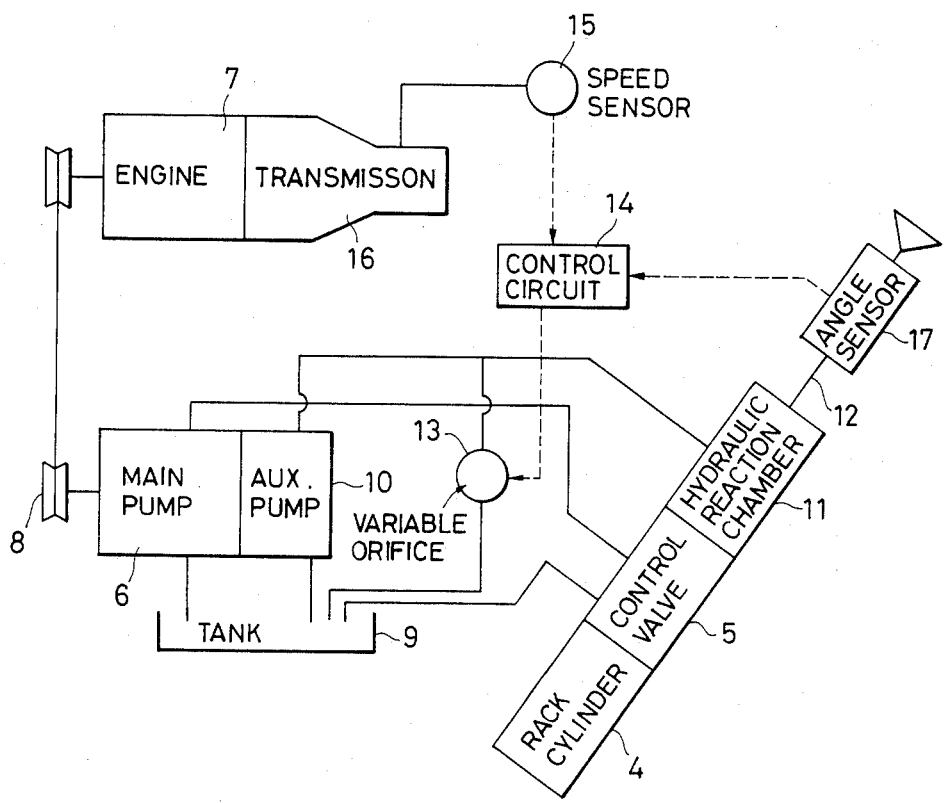
FIG. 4 is a schematic diagram of a steering power control apparatus in a power steering unit in which an embodiment of the sensor of the present invention is applied.

FIG. 4 is a system diagram showing a steering power controlling device of a power steering unit in which an embodiment of the sensor of the present invention is applied. In the drawing, a steering gear is provided with a power assistance mechanism constituted by a rack cylinder 4 and a controlling valve 5, etc. A main pump 6 is rotatably driven through a pulley 8 by an engine 7 during rotation of the engine 7 so as to pressurize fluid drawn from a tank 9. The pressurized fluid is supplied to a controlling valve 5 in the power assistance mechanism and caused to flow back into the tank 9. An auxiliary pump 10 is also rotatably driven by the engine 7 so as to pressurize fluid drawn from the tank 9 and to supply the pressurized fluid into a hydraulic reaction chamber 11.

The hydraulic reaction chamber 11 receives the pressurized fluid and as a result varies an equivalent spring constant between a handle shaft (an input shaft) 12 and a steering gear side shaft (an output shaft). The opening of the controlling valve 5 is determined by the quantity of relative displacement between the input shaft 12 and the output shaft, and, therefore, is controlled by the reaction pressure of the hydraulic reaction chamber 11. A variable orifice 13 is provided for controlling the reaction pressure in the hydraulic reaction chamber 11 and the opening of the variable orifice 13 is controlled by a controlling signal generated from a controlling circuit 14.

The steering power for the power steering is varied depending on several external factors including conditions of steering, running conditions of a vehicle such as curves and hills in a road, conditions of road surfaces, the number of persons in the vehicle, weight load, vehicle speed, and so on. Accordingly, the controlling circuit 14 is supplied with measured values of all or some of the above-mentioned external factors and generates a controlling signal corresponding to the supplied measured values to control the opening of the orifice 13. Among the external factors, vehicle speed and steering angle are used in the embodiment of FIG. 4.

A vehicle speed sensor 15 is provided to electrically detect the rotation of an output shaft of a transmission 16 and to supply a vehicle speed signal to the controlling circuit 14. A steering angle sensor 17 is constituted by a potentiometer, or the like. The steering angle sensor 17 is arranged, for example, such that the stationary side thereof is attached onto a stationary portion around the handle shaft and the slidable side thereof is fixed to the handle shaft 12, so as to detect the steering angle in the form of a voltage signal that is in turn supplied to the controlling circuit 14.

Figure 6C:
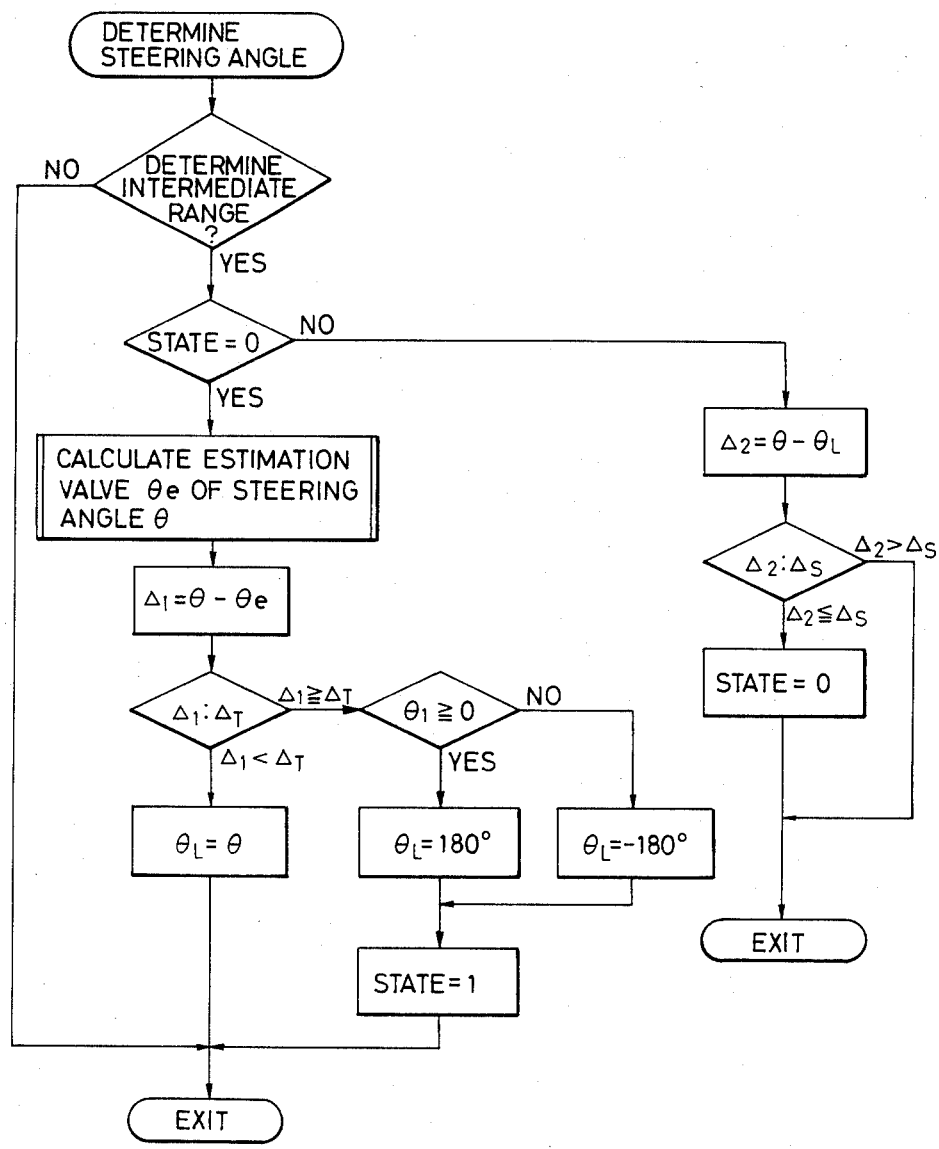

FIG. 5 is a circuit diagram in which the steering angle sensor 17 is constituted by a potentiometer 18 having an output terminal connected with an A/D converter 20 through an RC lowpass filter 19. The output of the A/D converter 20 is subject to predetermined signal processing in a manner as shown in FIGS. 6A through 6C by a microcomputer 21 provided in the next stage.

FIG. 6A is a flow chart showing an outline of the signal processing operations on the output of the A/D converter 20 as performed by the microcomputer 21 provided in the next stage. The microcomputer 21 samples the output of the A/D converter 20 at a speed sufficiently higher than the steering speed.

In the flow chart of FIG. 6A, the vehicle speed and the steering angle $\theta$ are read into the microcomputer 21 in step 22. The vehicle speed, as described above, is read out from the output of the vehicle sensor 15 shown in FIG. 4. In step 23, judgment is made as to whether the steering angle is positioned in an intermediate range of the steering angle sensor, that is, the range A shown in FIG. 1B.

FIG. 6B is a flow chart showing the details of a program for determining whether or not the steering angle is in the intermediate range. At first, it is determined whether the read-in data of the vehicle speed is larger or smaller than a reference value v. The reason why this determination is made is that the rotational angular position of the handle shaft is not clear during the initial starting of the vehicle. That is, it is not clear in which one of the ranges A, B, and C in FIG. 1B the steering angle is positioned at the start of operation, and therefore, it is possibly erroneous to consider that the starting position of the handle shaft is located in the range A. If the vehicle speed is equal to or larger than the reference value v, a further test is made as to whether or not the sampled data of the steering angle is within a predetermined range of $\theta_1 \leq \theta \leq \theta_2$. If the data is within the above-mentioned range, a further test is made to determine whether or not the data have continuously been in this range for a predetermined time. If the data has been in this range for the predetermined time, it is determined that the present range is the intermediate range, that is, the range A in FIG. 1B. This is because if the steering angle $\theta$ has remained continuously in a predetermined range for a predetermined time under the condition of a certain vehicle speed equal to or higher than a predetermined value after the starting of operation of the vehicle, it can be considered that the vehicle has been running substantially rectilinearly and, therefore, the judgment as to whether the vehicle enters such a running condition can be performed by the above-mentioned processing.

In the flow chart in FIG. 6A, upon the completion of the above-mentioned determination of operation in the intermediate range, the steering angle is determined in step 24. FIG. 6C is a flow chart showing details of a program for determining the steering angle. First, a judgment is made as to whether the determination of the intermediate range of the steering angle has been completed or not. If the intermediate range has been determined, it is determined in the next step whether data correction for eliminating the above-mentioned influence of charge and discharge of the capacitor has been performed or not in the preceding determination of the steering angle.

To do this, a flag is set to state "1" when data correction has been performed, and to state "0" when data correction has not been performed. In state "0", an estimation value $\theta_e$ of the steering angle $\theta$ is calculated on the basis of the train of sampled data. The method of calculating the estimation value $\theta_e$ may be selected from, for example, a method of estimating the steering angle $\theta_e$ on the basis of a function obtained through a least squares method or the like or a method of comparing a value $f'(t_1)$ with a difference value $\{f(t_1)-f(t_0)\}$ between a measured value $f(t_1)$ and a preceding measured value $f(t_0)$, the value $f'(t_0)$ being obtained by Gregory-Newton's backward interpolation formula as follows:

$$f'(t_0) = (\Delta f_{-1} + \tfrac{1}{2}\Delta hu\ 2f_{-2} + \tfrac{1}{3}\Delta^3 f_{-3} + \ldots)$$

where $$\Delta f_{-1} = f(t_0) - f(t_{-1})$$

$$\Delta f_{-2} = f(t_{-1}) - f(t_{-2})$$

$$\Delta f_{-3} = (t_{-2}) - f(t_{-3})$$

$$\Delta^2 f_{-2} = \Delta f_{-1} - \Delta f_{-2}$$

$$\Delta^3 f_{-3} = \Delta f_{-2} - \Delta f_{-3}$$

In the next step, the difference value $\Delta_1 = \theta - \theta_e$ between the sampling data $\theta$ and the above-mentioned estimation value $\theta_e$ is calculated and compared with a reference value $\Delta_T$. In this comparison, when the difference value $\Delta_1$ is smaller than the reference value $\Delta_T$, it is determined that there is no steep variations in the output voltage from the above-mentioned steering angle sensor 17 due to the charge and discharge of the capacitor as in the cases shown at portions A1–A4 in FIGS. 3A through 3C. Thus, the sampling data read from the A/D converter 20 is determined to be a steering angle $\theta_L$ to be used for the steering power control.

In the foregoing comparison, if the difference value $\Delta_1$ is judged to be equal to or larger than the reference value $\Delta_T$, a further test is made to determine whether the preceding measured value $\theta_{-1}$ is positive or negative. This is because when the difference value $\Delta_1$ is judged to be equal to or larger than the reference value $\Delta_T$, it is deemed that the steering angle is in the range in the vicinity of $+180$ degrees or $-180$ degrees where a silider member 18a of the potentiometer 18 assumes a floating state to cause the charge and discharge phenomenon. When the preceding measured value $\theta_{-1}$ is positive, the preceding steering angle is deemed to be close to the value of $+180$ degrees and the current steering angle $\theta_L$ is determined to be $+180$ degrees. If the steering angle $\theta_L$ is negative, the preceding steering angle is considered to be close to the value of $-180$ degrees and the preceding steering angle $\theta_H$ is determined to be $-180$ degrees. After such data correction has been completed, the flag is set to state "1". This principle is based on that fact that in the normal steering state in the range A as shown in FIG. 1B, the steering angle signal varies continuously as shown in FIG. 3D even if the steering is performed very abruptly, unlike the discontinuous variations as shown in FIGS. 3A, 3B and 3C.

In determining whether data correction has been performed or not after the determination of being in the intermediate range or not, if the flag is set to state "1", the difference value $\Delta_2 = \theta - \theta_L$, i.e., the difference between the sampling data $\theta$ and the preceding steering angle $\theta_L$, is calculated, and the difference value $\Delta_2$ is compared with a reference value $\Delta_S$. In this comparison, when the difference value $\Delta_2$ is larger than the reference value $\Delta_S$, it is deemed that the steering angle is still in the range of the vicinity of $+180$ degrees of $-180$ degrees i.e., a position where the slider member 18a of the potentiometer 18 is in a floating state to cause the charge and discharge phenomenon, and the state of the flag is not changed and the previously determined value of $+180$ degrees or $-180$ degrees is used as the current steering angle $\theta_L$. If the difference value $\Delta_2$ is equal to or less than the reference value $\Delta_S$, it is deemed that the steering angle has returned to the range above $+180$ degrees or the range below $-180$ degrees, and the flag is set to be in state "0". Then the above-mentioned calculation of the estimation value $\theta_0$, etc., is performed with respect to the succeeding sampling data $\theta$.

In the flow chart in FIG. 6A, after the above-mentioned determination of the steering angle, other additional processing is performed in the next step 25. The foregoing execution is performed repeatedly every time data is sampled.

Thus, the output from the steering angle sensor or potentiometer 18 read-in through the A/D converter 20 is subject to processing by the microcomputer 21 as described above to discriminate the signal generated by the actual steering operation from the signal due to the charge and discharge of the capacitor without depending on the time constant of the charge and discharge.

Further, in this embodiment description was made of an example in which the steering angle is detected in the range of from $+180$ to $-180$ degrees which is wide enough for the detection in the case of a vehicle speed. Even in the case where the steering angle is determined in a wide range, such as beyoned $\pm 180$ degrees, the invention can be easily carried out by separately performing the detection of completion of the charge and discharge of the capacitor.

In the method of processing a steering angle sensor signal according to the present invention, one revolution of steering can be used as a full dynamic range, so that it is possible to achieve high revolution in detecting the steering angle. Further, it is possible to detect a steering angle corresponding to an actual steering state without depending on the steering speed or the time constant of the charge and discharge capacitor in a noise filter.

What is claimed is:

1. A method for generating a steering angle signal for a motor vehicle by processing a signal produced by a steering angle sensor to eliminate erroneous steering angle signal values caused by a floating state of a potentiometer included in the sensor to output the steering angle signal value corresponding to the rotational angle of a rotatable steering handle shaft where the erroneous signal values occur at specific angular positions of the handle shaft when the potentiometer is in the floating state, the method comprising the steps of:

determining the current steering angle signal value outputted by the potentiometer;

determining if the rotational angle of the handle shaft is within a selected range of rotational angles;

calculating an estimated steering angle signal value if the rotational angle of the handle shaft is determined to be within said selected range of rotational angles;

calculating a first difference value corresponding to the difference between said current steering angle signal value and said estimated steering angle signal value;

setting the steering angle signal to the current steering angle signal value if said first difference value is less than a predetermined difference value; and setting the steering angle signal to a predetermined angle signal value if said first difference value is greater than or equal to said predetermined difference value whereby the steering angle signal is set to the current steering angle signal value if the potentiometer is not in the floating state and is set to said predetermined angle signal value if the potentiometer is in the floating state.

2. A method according to claim 1, wherein said step of determining if the rotational angle of the handle shaft is within a selected range of rotational angles comprises the steps of:

repeatedly determining the speed of the motor vehicle;

repeatedly determining the current steering angle of the motor vehicle; and determining that the rotational angle of the handle shaft is within said selected range of rotational angles if for a predetermined period of time the speed of the motor vehicle is greater than a predtermined speed and the rotational angle of the handle shaft is less than an upper limit rotational angle and greater than a lower limit rotational angle.

3. A method according to claim 1, wherein the estimated steering angle signal value is calculated using the least squares method.

4. A method according to claim 1, wherein the estimated steering angle signal value is calculated using Gregory-Newton's backward interpolation formula.

5. A method according to claim 1, wherein the step of setting the steering angle signal to a predetermined angle signal value includes the steps of:

calculating a second difference value corresponding to the difference between the current steering angle signal value and the value of the preceding steering angle signal and setting the steering angle signal to a positive predetermined value if the second difference value is greater than or equal to zero and to a negative predetermined value if the second difference value is less than zero.

* * * * *